United States Patent
Kimura et al.

(10) Patent No.: US 9,350,880 B2
(45) Date of Patent: May 24, 2016

(54) IMAGE PROCESSING APPARATUS, IMAGE PROCESSING METHOD AND NON-TRANSITORY COMPUTER READABLE MEDIUM

(71) Applicant: FUJI XEROX CO., LTD., Tokyo (JP)

(72) Inventors: Tetsuya Kimura, Yokohama (JP);
Atsushi Hirano, Yokohama (JP);
Hitoshi Okamoto, Yokohama (JP);
Kengo Shinozaki, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/644,661

(22) Filed: Mar. 11, 2015

(65) Prior Publication Data
US 2015/0189105 A1    Jul. 2, 2015

Related U.S. Application Data

(63) Continuation of application No. PCT/JP2013/066644, filed on Jun. 18, 2013.

(30) Foreign Application Priority Data

Oct. 11, 2012  (JP) .................... 2012-226163

(51) Int. Cl.
H04N 1/04   (2006.01)
H04N 1/00   (2006.01)
H04N 1/387  (2006.01)

(52) U.S. Cl.
CPC ......... *H04N 1/00005* (2013.01); *H04N 1/3872* (2013.01)

(58) Field of Classification Search
CPC .......................... H04N 1/0005; H04N 1/3872
USPC ........................... 358/1.15, 1.9, 474
See application file for complete search history.

(56) References Cited

U.S. PATENT DOCUMENTS

2002/0154221 A1* 10/2002 Ishimaru ............. H04N 1/0001
                                                    348/207.1
2008/0174790 A1*  7/2008 Noguchi et al. ............... 358/1.1

FOREIGN PATENT DOCUMENTS

| JP | 10-305960 A    | 11/1998 |
| JP | 2008-022175 A  | 1/2008  |
| JP | 2008-176557 A  | 7/2008  |

OTHER PUBLICATIONS

Search Report dated Sep. 10, 2013, issued by the International Searching Authority in counterpart International Application No. PCT/JP2013/066644.
Written Opinion dated Sep. 10, 2013 issued by the International Searching Authority in counterpart International Application No. PCT/JP2013/066644.

* cited by examiner

*Primary Examiner* — Houshang Safaipour
(74) *Attorney, Agent, or Firm* — Sughrue Mion, PLLC

(57) ABSTRACT

There is provided an image processing apparatus. An image sequence acquisition section acquires an image sequence including a plurality of images. A sorting information acquisition section analyzes the individual images included in the image sequence, and acquires sorting information corresponding to the images on the basis of an analysis result. An image sequence generation section generates, based on the sorting information, one or a plurality of pieces of information indicating an image sequence which includes at least part of the plurality of images.

3 Claims, 8 Drawing Sheets

| SCANNED IMAGE | IMAGE NUMBER | SORTING INFORMATION |
|---|---|---|
| SCANNED IMAGE (1) | i = 1 | P = 1, Q = 1, T = ..., ... |
| SCANNED IMAGE (2) | i = 2 | P = 2, Q = 1, T = ..., ... |
| ... | ... | ... |

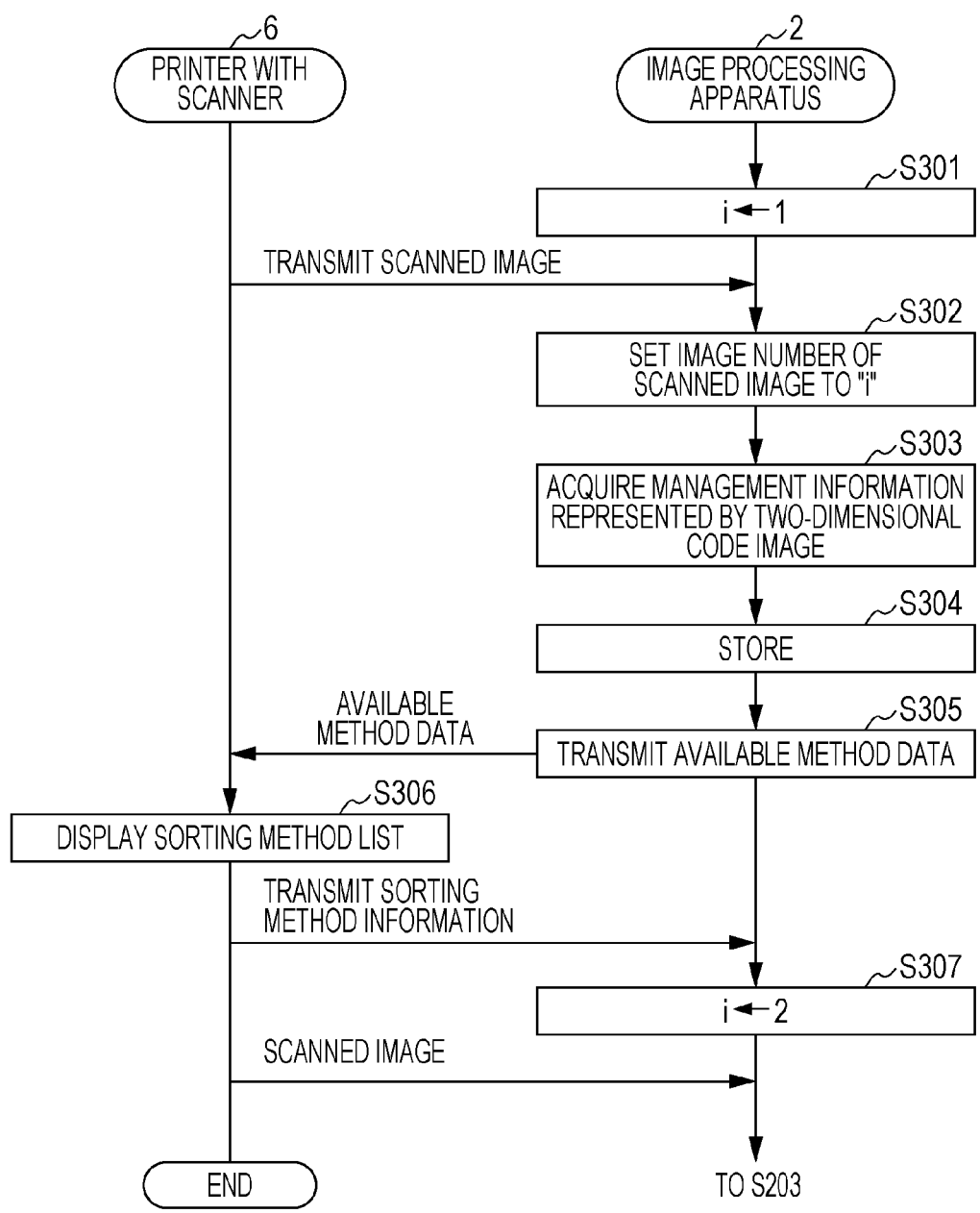

IMAGE PROCESSING APPARATUS, IMAGE PROCESSING METHOD AND NON-TRANSITORY COMPUTER READABLE MEDIUM

CROSS-REFERENCE TO RELATED APPLICATIONS

This is a continuation of International Application No. PCT/JP2013/066644 filed on Jun. 18, 2013, and claims priority from Japanese Patent Application No. 2012-226163, filed on Oct. 11, 2012.

TECHNICAL FIELD

The present invention relates to an image processing apparatus, an image processing method and a program.

SUMMARY

According to an aspect of the exemplary embodiments of the present invention there is provided an image processing apparatus includes an image sequence acquisition section that acquires an image sequence including a plurality of images; a sorting information acquisition section that analyzes the individual images included in the image sequence, and acquires sorting information corresponding to the images on the basis of an analysis result; and an image sequence generation section that generates, based on the sorting information, one or a plurality of pieces of information indicating an image sequence which includes at least part of the plurality of images.

BRIEF DESCRIPTION OF DRAWINGS

Exemplary embodiments of the present invention will be described in detail based on the following figures, wherein:

FIG. 9 is a diagram illustrating an example of a process performed by a printer with scanner and an image processing apparatus.

DETAILED DESCRIPTION

Hereinafter, exemplary embodiments of the present invention will be described in detail with reference to the drawings.

Figure 1:
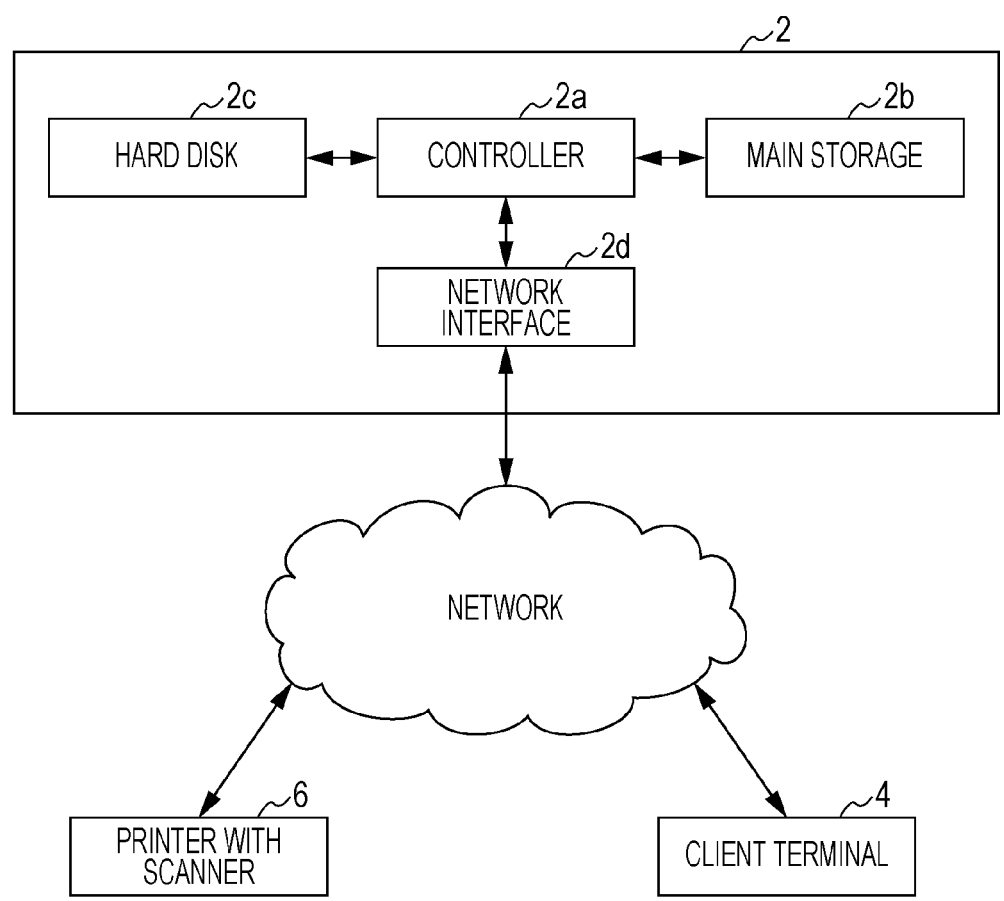
FIG. 1 is a diagram illustrating an example of the configuration of an image processing apparatus.

FIG. 1 is a diagram illustrating an example of the configuration of an image processing apparatus 2 according to an exemplary embodiment of the present invention. The image processing apparatus 2 is a server computer owned by a university, and includes a controller 2a, a main storage 2b, a hard disk 2c, a network interface 2d, and the like. The controller 2a is a microprocessor which performs various types of information processing in accordance with an image processing program stored in the main storage 2b. The main storage 2b is implemented by a ROM and a RAM, and the image processing program is stored in advance in the main storage 2b. In this example, the image processing program is read from a computer-readable information storage medium (e.g. DVD (registered trademark)-ROM) and stored in the main storage 2b. However, the image processing program may be downloaded via a network and stored in the main storage 2b.

Figure 2:
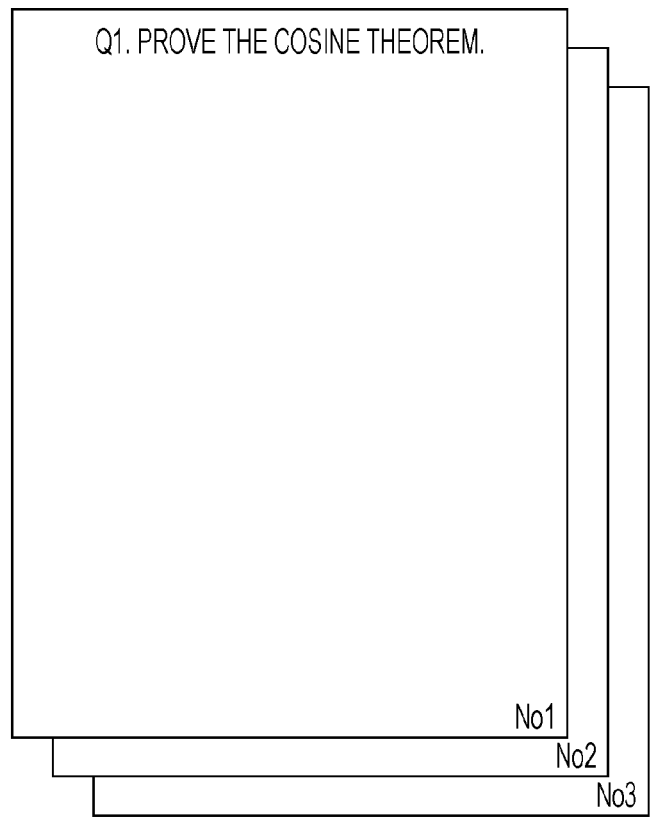
FIG. 2 is a diagram illustrating an example of a test paper document.

In the hard disk 2c, a test paper document, which is document data created by a document creation application, is stored in advance. FIG. 2 illustrates an example of the test paper document. The test paper document is prepared by a teacher and stored in the hard disk 2c. In the hard disk 2c, document data other than the test paper document is also stored.

Other types of information stored in the hard disk 2c will be described later.

The network interface 2d is an interface which connects the image processing apparatus 2 to the network. To the network, a client terminal 4 and a printer with scanner 6, which can also be called a multifunction apparatus, are also connected. The image processing apparatus 2 is capable of transmitting/receiving data to/from the client terminal 4 and the printer with scanner 6.

The client terminal 4 is used by a teacher. In this example, a case where a teacher prints a test paper document will be discussed. However, there is also a case where a teacher prints a document different from a test paper document. When a test day is approaching, the teacher prints copies of a test paper document for the number of students. Specifically, the teacher accesses the image processing apparatus 2 through the client terminal 4, and performs a printing execution operation by inputting the number of copies for printing and the like. As a result, a printing execution instruction is transmitted to the printer with scanner 6, and the test paper document is printed by the printer with scanner 6.

Figure 3:
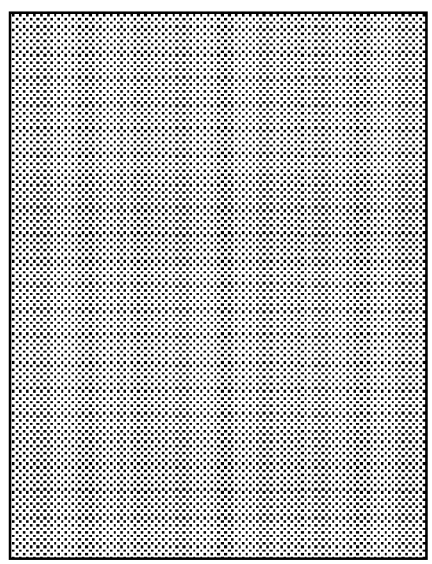
FIG. 3 is a diagram illustrating an example of a two-dimensional code image.
Figure 4:
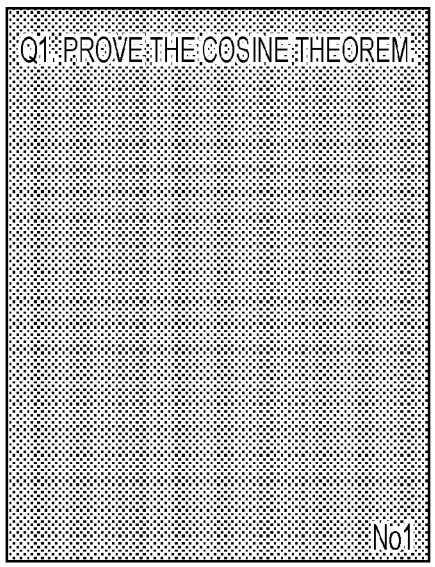
FIG. 4 is a diagram illustrating an example of a composite image.

Here, in the image processing apparatus 2, management information is embedded in an image of the test paper document. More specifically, a composite image of the image of the test paper document and a two-dimensional code image illustrated in FIG. 3, is generated by the image processing apparatus 2, and the composite image is printed by the printer with scanner 6. FIG. 4 illustrates an example of the composite image.

Figure 5:
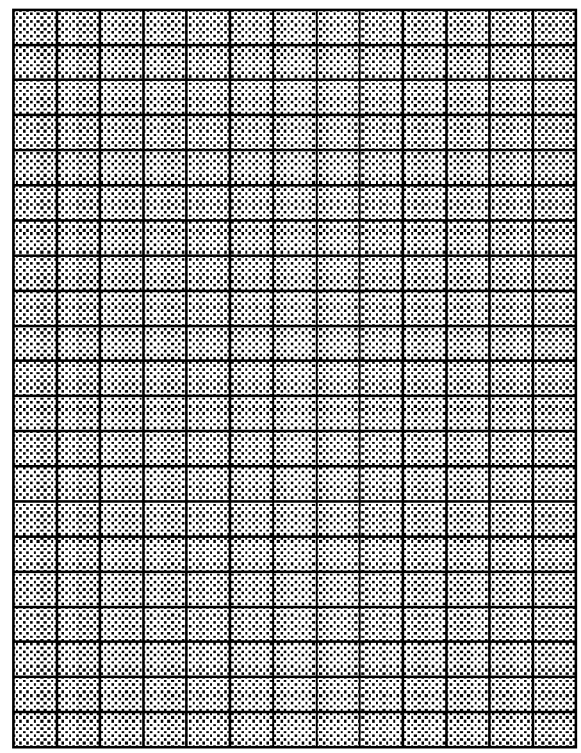
FIG. 5 is a diagram for explaining a two-dimensional code image.

FIG. 5 is a diagram for explaining a two-dimensional code image illustrated in FIG. 3. In this exemplary embodiment, the two-dimensional code image includes a unit code image arranged in a matrix, as illustrated in FIG. 5. The unit code image is an image of a code pattern representing management information embedded in an image of a test paper document. In this exemplary embodiment, a plurality of bit symbols each representing a bit value "1" or a bit value "0" are included in the unit code image.

In this exemplary embodiment, specifying data which specifies management information to be embedded in an image to be printed is stored in advance in the hard disk 2c, and information specified by the specifying data is embedded as management information in the image to be printed. In this case, management information, such as a page number P in the test paper document, a copy number Q which indicates the position in a sequence of printed copies, a printing execution date and time T, a test paper document ID (hereinafter, referred to as a document ID), and a class number of a class the teacher is in charge of, is embedded in the image of the test paper document, which is the image to be printed. The specifying data is updated by an administrator of the image processing apparatus 2 or the teacher as required.

The teacher distributes the printed test paper document as answer sheets to students who are under the teacher's supervision and conducts a test. After the conduct of the test, the teacher collects the answer sheets randomly from all the students, marks the paper, and reports marking results to an educational affairs section. In addition, the teacher also submits the marked answer sheets to the educational affairs section.

A staff of the educational affairs section places a bundle of sheets of printing paper received from the teacher in an ADF (Auto Document Feeder) of the printer with scanner 6, performs a scanning execution operation, and causes the printer with scanner 6 to scan each sheet of the printing paper. Thus, the staff of the educational affairs section stores each sheet of the printing paper as image data in the hard disk 2c of the image processing apparatus 2.

This is not the only feature. That is, in the image processing apparatus 2, image data of printing paper is not only saved but also sorted. Specifically, a list of pre-registered multiple sorting methods (hereinafter, a sorting method list) is displayed on a display panel of the printer with scanner 6, and the image data of the printing paper is sorted in accordance with a sorting method selected by the staff of the educational affairs section in the scanning execution operation. Thus, management of the image data of the printing paper is simplified. This aspect will be described below.

Figure 6:
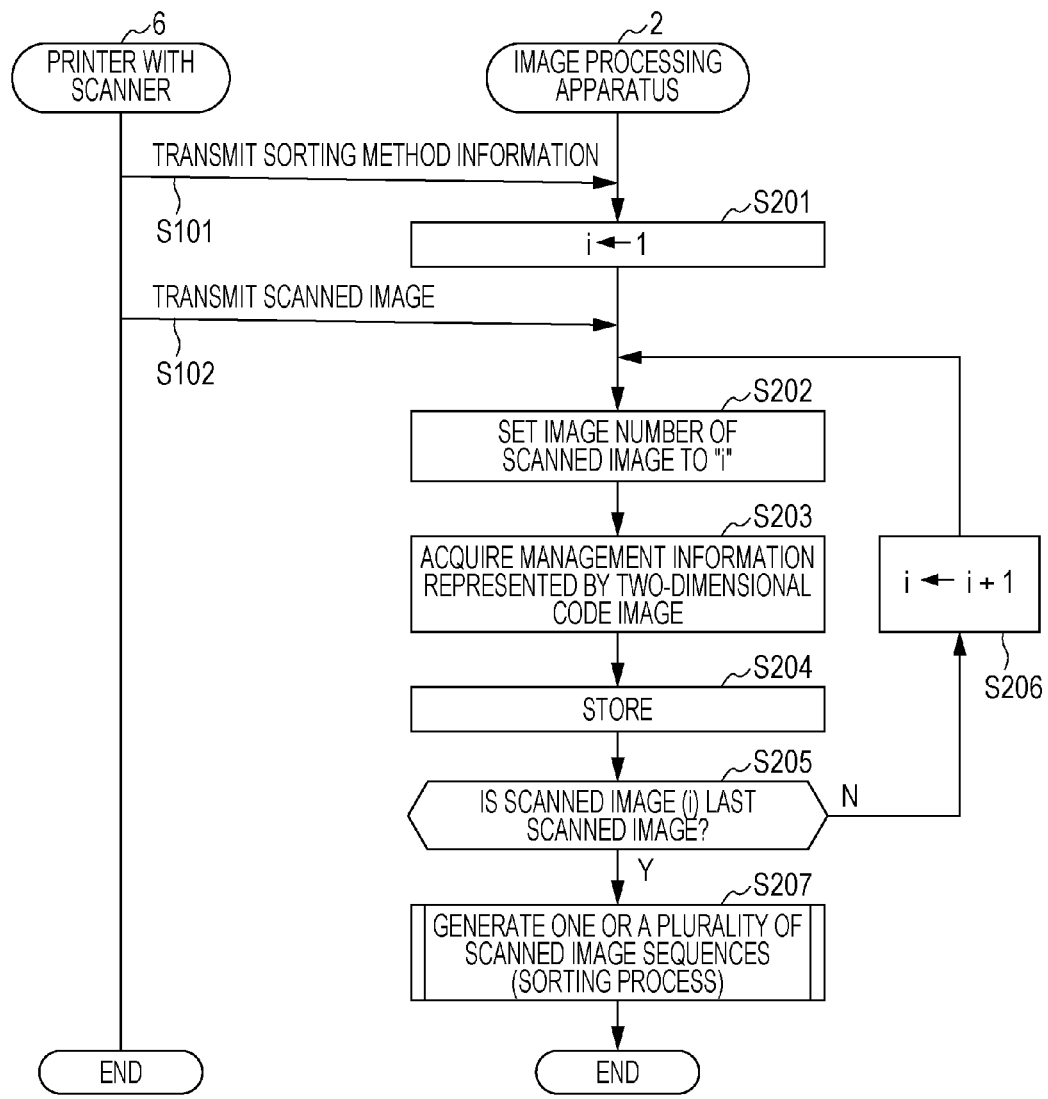
FIG. 6 is a diagram illustrating an example of a process performed by a printer with scanner and an image processing apparatus.

FIG. 6 is a diagram illustrating an example of a process performed by the printer with scanner 6 and the image processing apparatus 2 when a scanning execution operation is performed.

As illustrated in FIG. 6, the printer with scanner 6 transmits to the image processing apparatus 2 sorting method information indicating a sorting method selected by the staff of the educational affairs section (S101). Then, every time scanning a sheet of printing paper, the printer with scanner 6 transmits to the image processing apparatus 2 the scanned image read from the surface of the printing paper (S102).

In the image processing apparatus 2 which has received the sorting method information, the controller 2a sets the value of a parameter "i", which is held in the main storage 2b, to "1" (S201). Then, every time the image processing apparatus 2 receives a scanned image, the controller 2a performs processing of steps S202 to S204 for the scanned image.

That is, the controller 2a (image sequence acquisition means) sets the image number of the scanned image received by the image processing apparatus 2 to "i" (S202). Hereinafter, a scanned image whose image number is "i" is described as a scanned image (i).

In S203, the controller 2a (sorting information acquisition means) analyzes the scanned image (i) and acquires management information, as sorting information, represented by a two-dimensional code image included in the scanned image (i) (S203). Then, the controller 2a (image sequence acquisition means) stores entry data, in which the scanned image (i), the image number "i" of the scanned image, and the sorting information acquired in S203 are associated with each other, in a database (refer to FIG. 7 mentioned below) held in the hard disk 2c (S204).

Then, if the scanned image (i) is the last scanned image (Y in S205), the controller 2a (image sequence acquisition means) proceeds to step S207. If the scanned image (i) is not the last scanned image (N in S205), the controller 2a increments the value of the parameter "i" by "1" (S206), and performs S202 and the subsequent steps again.

Figures 7, 8A:
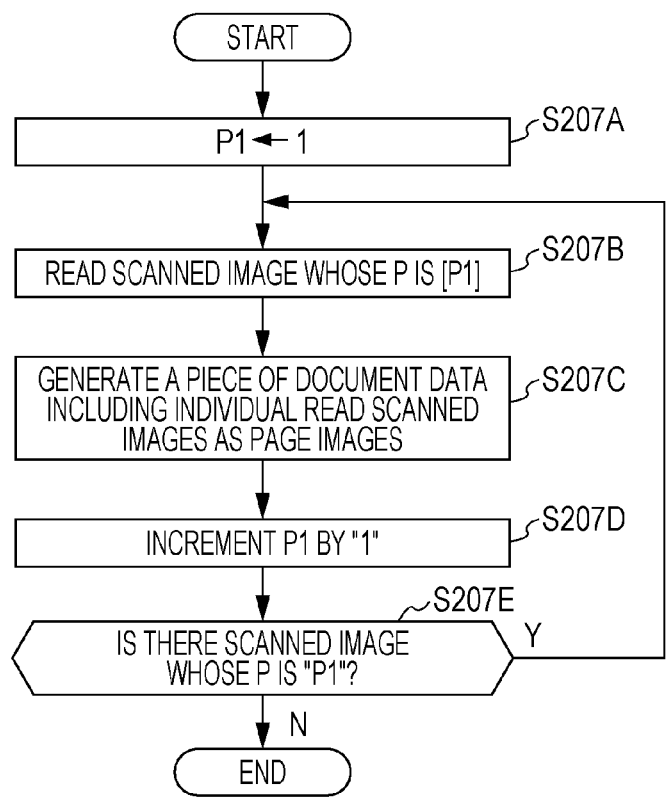
FIG. 7 is a diagram illustrating an example of a database.
FIG. 8A is a flow diagram illustrating an example of a sorting process.

FIG. 7 illustrates an example of the contents stored in the database after steps S202 to S204 are performed for all the scanned images received by the image processing apparatus 2. Based on the contents stored in the database, a scanned image sequence which includes a plurality of scanned images received by the image processing apparatus 2 is illustrated. An image number of a scanned image represents the positon of the scanned image in the scanned image sequence. For example, a scanned image with the image number "N" is the "N-th" scanned image.

In S207, the controller 2a (image sequence generation means) preforms a sorting process, which will be described later, based on the sorting information held in the database, and thereby generating one or a plurality of image sequences which include at least a part of a plurality of scanned images received by the image processing apparatus 2 (S207). However, the controller 2a performs the sorting process in accordance with a sorting method indicated by the sorting method information received by the image processing apparatus 2.

Hereinafter, a sorting process will be described for each sorting method. Here, a sorting process will be explained with examples of sorting methods A, B, and C, which are part of the plurality of sorting methods mentioned above. Hereinafter, a scanned image held in the database is identified by a value of sorting information associated with the scanned image. For example, a scanned image associated with a value "1" of a page number P will be referred to as a scanned image whose page number P is "1". Furthermore, for example, a scanned image associated with a value "1" of a copy number Q will be referred to as a scanned image whose copy number Q is "1".

FIG. 8A is a flow diagram illustrating an example of a sorting process according to the sorting method A. In the sorting method A, the page number P is mainly used for sorting. In this exemplary embodiment, in the sorting method A, scanned images are sorted for each page number P. That is, the controller 2a sets the value of a parameter "P1", which is held in the main storage 2b, to "1" (S207A).

Then, the controller 2a reads from the database scanned images with the value of the page number P being "P1" (S207B). After that, the controller 2a generates a piece of document data (information), which includes the read scanned images as individual page images (S207C), and stores the document data in the hard disk 2c. The position of each scanned image in the document data is defined by the copy number Q. That is, a scanned image with the value of the copy number Q being "N (N is an integer)" is defined as the "N-th" page image in the document data. The controller 2a may specify the direction (posture) of each scanned image read in S207B and change the direction of the scanned image so that the direction becomes a predetermined erected direction when generating the document data.

Then, the controller 2a increments the value of "P1" by "1" (S207D). If there is a scanned image with the value of the page number P being "P1" in the database (Y in S207E), the controller 2a performs S207 and the subsequent steps again. If there is no scanned image with the value of the page number P being "P1" in the database (N in S207E), the controller 2a ends the process.

Thus, the document data is generated for each page number P.

Figure 8B:
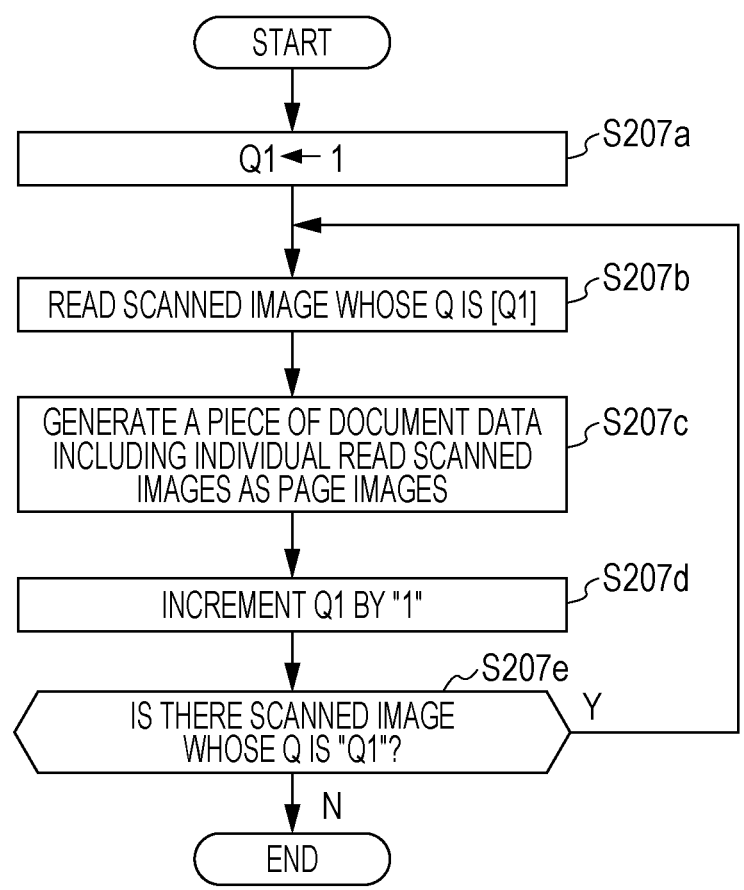
FIG. 8B is a flow diagram illustrating an example of a sorting process.

Next, a sorting process according to the sorting method B will be explained. FIG. 8B is a flow diagram illustrating an example of a sorting process according to the sorting method B. In the sorting method B, the copy number Q is mainly used for sorting. In this exemplary embodiment, in the sorting method B, scanned images are sorted for each copy number Q. That is, the controller 2a sets the value of a parameter "Q1", which is held in the main storage 2b, to "1" (S207a).

Then, the controller 2a reads from the database scanned images with the value of the copy number Q being "Q1" (S207b). After that, the controller 2a generates a piece of document data which includes the read scanned images as individual page images (S207d) and stores the document data in the hard disk 2c. The position of each scanned image in the document data is defined by the page number P. That is, a scanned image with the value of the page number P being "N (N is an integer)" is defined as the "N-th" page image in the document data. The controller 2a may change, as in the sorting method A, the direction of each scanned image so that the direction becomes a predetermined erected direction when generating the document data.

Then, the controller 2a increments the value of "Q1" by "1" (S207d). If there is a scanned image with the value of the copy number Q being "Q1" in the database (Y in S207e), the controller 2a performs step S207b and the subsequent steps again. If there is no scanned image with the value of the copy number Q being "Q1" in the database (N in S207e), the controller 2a ends the process.

Thus, the document data is generated for each copy number Q.

In the sorting method C, the printing execution date and time T is used for sorting. That is, in the sorting method C, a piece of document data, which includes all the scanned images received by the image processing apparatus 2 as individual page images, is generated based on the printing execution date and time T that is held in the database as sorting information. That is, a scanned image with the printing execution date and time T being the "N-th (N is a positive integer)" earliest is defined as the "N-th" page image. In this case, as in the sorting methods A and B, the controller 2a may change the direction of each scanned image so that the direction becomes a predetermined erected direction when generating the document data. Thus, the document data is generated.

It should be noted that an exemplary embodiment of the prevent invention is not limited to the exemplary embodiment described above.

For example, sorting information may not be acquired even though scanned images are analyzed due to a broken two-dimensional code image because of dirt, or absence of a two-dimensional code image in the first place. In the case where sorting information cannot be acquired even though the controller 2a analyzes the scanned image (i) in S203, the controller 2a (sorting information acquisition means) may acquire sorting information of the scanned image (i) on the basis of sorting information of a different scanned image. For example, in the case where the page number P cannot be acquired even though the controller 2a analyzes the scanned image (i) in S203, the controller 2a may acquire, as the page number P of the scanned image (i), a value incremented by "1" with respect to the value of the page number P of the scanned image (i−1), which is the previous image of the scanned image (i). Similarly, for example, in the case where the copy number Q cannot be acquired even though the controller 2a analyzes the scanned image (i) in S203, the controller 2a may acquire, as the copy number Q of the scanned image (i), the same value as the value of the copy number Q of the scanned image (i−1).

[Variation 1 and Variation 2]

A sorting method may be determined according to the type of sorting information acquired from scanned images. For example, processes illustrated in FIG. 9 and FIG. 10 may be performed by the printer with scanner 6 and the image processing apparatus 2.

Figure 10:
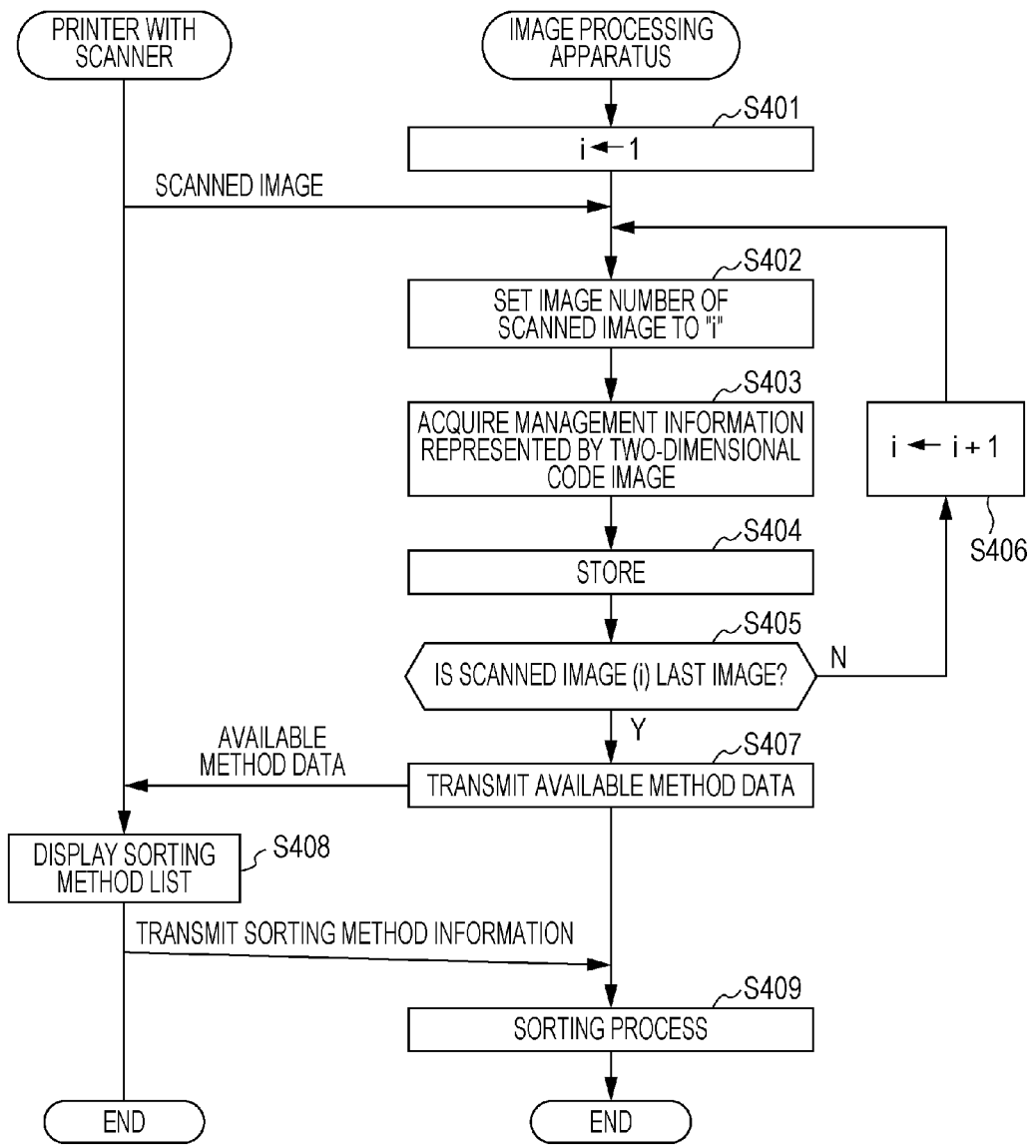
FIG. 10 is a diagram illustrating an example of a process performed by a printer with scanner and an image processing apparatus.

In FIG. 9 and FIG. 10, specifying a sorting method is not performed at the time of a scanning execution operation. A sorting method is determined according to the type of sorting information acquired from scanned images. FIG. 9 will be explained first.

[Variation 1]

In FIG. 9, that is, in Variation 1, when a scanning execution operation is performed, first, the printer with scanner 6 scans only the first sheet of printing paper. As a result, as in S201, the controller 2a sets the value of the parameter "i" to "1" (S301). Then, the controller 2a sets the image number of the scanned image on the first sheet of printing paper received by the image processing apparatus 2 to "i" (S302). As in step of S203, the controller 2a also analyzes the scanned image (i) and acquires management information, as sorting information, represented by a two-dimensional code image which is included in the scanned image (i) (S303). Then, as in step of S204, the controller 2a stores entry data, in which the scanned image (i), the image number "i" of the scanned image, and the sorting information acquired in S303 are associated with each other, in the database held in the hard disk 2c (S304).

Furthermore, the controller 2a identifies, based on the type of the sorting information acquired in S303, a sorting method to be performed using the information acquired as the sorting information, from among the plurality of sorting methods mentioned above, and transmits available method data, which guides the identified sorting method, to the printer with scanner 6 (S305).

On the printer with scanner 6 which has received the available method data, a sorting method list including sorting methods guided by the available method data, is displayed (S306). A staff of the educational affairs section selects a sorting method from the displayed sorting method list. As a result, the sorting method information indicating the selected sorting method is transmitted to the image processing apparatus 2. In the image processing apparatus 2 which has received the sorting method information, the value of the parameter "i" is incremented by one (S307).

After that, the printer with scanner 6 sequentially scans the second and subsequent sheets of printing paper, and transmits the scanned images to the image processing apparatus 2. As a result, every time the image processing apparatus 2 receives a scanned image, the controller 2a performs S303 and the subsequent steps.

[Variation 2]

Next, FIG. 10, that is, Variation 2 will be explained.

As described above, specifying data is updated as needed. For example, when a criterion for management is changed, the specifying data is updated in an appropriate manner. Furthermore, the specifying data is appropriately updated in accordance with the characteristics of a document to be printed. A staff of the educational affairs section does not necessarily only scan answer sheets but also scan a mixture of multiple types of documents. Therefore, not all the pieces of sorting information held in the database (see FIG. 7) necessarily hold the same information. Therefore, in FIG. 10, a sorting method is determined not based on the sorting information acquired from the scanned image of the first sheet of printing paper but based on the sorting information acquired from the scanned images of all the sheets of printing paper.

That is, in FIG. 10, when a scanning execution operation is performed, as in S201, the controller 2 first sets the value of the parameter "i" to "1" (S401). Then, every time the image processing apparatus 2 receives a scanned image, the controller 2a performs steps S402 to S406.

That is, as in S202, the controller 2a sets the image number of the scanned image received by the image processing apparatus 2 to "i" (S402). As in S203, the controller 2a also analyzes the scanned image (i) and acquires management information, as sorting information, represented by a two-dimensional code image included in the scanned image (i) (S403). Then, the controller 2a stores entry data, in which the scanned image (i), the image number "i" of the scanned image, and the sorting information acquired in S403 are associated with each other, in the database held in the hard disk 2c (S404).

Then, if the scanned image (i) is the last scanned image (Y in S405), the controller 2a proceeds to step S407. If the scanned image (i) is not the last scanned image (NO in S405), the controller 2a increments the value of the parameter "i" by "1" (S406), and performs S402 and the subsequent steps again.

Then, the controller 2a identifies information commonly included in all the pieces of sorting information held in the database, identifies a sorting method to be performed using the identified information, from among the plurality of sorting methods mentioned above, and transmits to the printer with scanner 6 available method data which guides the identified sorting method (S407).

On the printer with scanner 6 which has received the available method data, a sorting method list including sorting methods guided by the available method data, is displayed (S408). A staff of the educational affairs section selects a sorting method from the displayed sorting method list. As a result, the sorting method information indicating the selected sorting method is transmitted to the image processing apparatus 2. In the image processing apparatus 2 which has received the sorting method information, the controller 2a performs a sorting process, as in S207 (S409).

In consideration of the presence of information which is included in not all but part of the pieces of sorting information held in the database, in Variation 2, the controller 2a may identify the union of information included in the individual pieces of sorting information held in the database and transmit to the printer with scanner 6 data indicating a list of information in the union, in place of the available method data, in S407. On the printer with scanner 6 which has received the data, the list of the information in the union, not a sorting method list, is displayed (S408). A staff of the educational affairs section selects, from the information presented in the list, information to be used for sorting. In S409, the controller 2a performs a sorting process based on the information selected by the staff of the educational affairs section. For example, in the case where a class number is selected as information to be used for sorting, the controller 2a generates document data including individual scanned images as page images associated with sorting information which includes class numbers, and at the same time, separately generates document data including individual scanned images as page images associated with sorting information which does not include class numbers, in S409.

[Others]

For example, when printing an image with the image processing apparatus 2, instead of a two-dimensional code image indicating the above-mentioned management information, a two-dimensional code image indicating a paper ID which uniquely identifies a sheet of printing paper may be embedded, and the management information may be separately stored in the hard disk 2c in association with the paper ID. In this case, in S203, S303, and S403, the controller 2a identifies the paper ID represented by the two-dimensional code image included in the scanned image (i), and reads the management information, as sorting information, which held in the hard disk 2c in association with the identified paper ID. The controller 2a may, in response to a request by a user (for example, an administrator or teacher), update the management information held in the hard disk 2c. For example, information input by the user may be added to the management information selected by the user. This is because the criterion for management will be changed later.

Furthermore, the present invention is applicable not only to the educational field but also to various other services and businesses such as finance, food, and the like. That is, the present invention is not only applicable to the test paper document but also applicable to the case where images of a document, such as a business form used in various services and businesses, including management information embedded therein are printed on printing paper. In this case, information to be used as management information may be properly selected according to the field.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

The invention claimed is:

1. An image processing apparatus comprising:
   at least one processor configured to execute:
      an image sequence acquisition section configured to acquire an image sequence including a plurality of images;
      a sorting information acquisition section configured to analyze the individual images included in the image sequence, and to acquire sorting information corresponding to the images using an analysis result; and
      an image sequence generation section configured to generate, using the sorting information, one or a plurality of pieces of information indicating an image sequence which includes at least part of the plurality of images in accordance with a method selected by a user from among a plurality of methods,
   wherein the plurality of methods are identified using at least one of common sorting information, acquired from the analysis result by the sorting information acquisition section, corresponding to all the images, or a union of sorting information, acquired from the analysis result by the sorting information acquisition section, corresponding to the individual images.

2. An image processing method comprising:
   acquiring, by at least one processor an image sequence including a plurality of images;
   analyzing, by the at least one processor, the individual images included in the image sequence;
   acquiring, by the at least one processor, sorting information corresponding to the images using an analysis result; and generating, by the at least one processor, using the sorting information, one or a plurality of pieces of information indicating an image sequence which includes at least part of the plurality of images in accordance with a method selected by a user from among a plurality of methods, wherein the plurality of methods are identified using at least one of common acquired sorting information, acquired from the analysis result, corresponding to all the images, or a union of acquired sorting information, acquired from the analysis result, corresponding to the individual images acquired.

3. A non-transitory computer readable medium storing a program for causing a computer to execute an image processing process, the process comprising:

acquiring an image sequence including a plurality of images;

analyzing the individual images included in the image sequence;

acquiring sorting information corresponding to the images using an analysis result; and generating, using the sorting information, one or a plurality of pieces of information indicating an image sequence which includes at least part of the plurality of images in accordance with a method selected by a user from among a plurality of methods, wherein the plurality of methods are identified using at least one of common acquired sorting information, acquired from the analysis result, corresponding to all the images, or a union of acquired sorting information, acquired from the analysis result, corresponding to the individual images acquired.

* * * * *